United States Patent
Korkishko et al.

(10) Patent No.: US 7,992,207 B2
(45) Date of Patent: Aug. 2, 2011

(54) METHOD FOR CURING A VIRUS ON A MOBILE COMMUNICATION NETWORK

(75) Inventors: Tymur Korkishko, Suwon-si (KR); Kyung-hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1185 days.

(21) Appl. No.: 11/313,919

(22) Filed: Dec. 22, 2005

(65) Prior Publication Data

US 2006/0191011 A1 Aug. 24, 2006

(30) Foreign Application Priority Data

Feb. 24, 2005 (KR) .................. 10-2005-0015483

(51) Int. Cl.
G06F 11/00 (2006.01)
G06F 12/14 (2006.01)
G06F 12/16 (2006.01)
G08B 23/00 (2006.01)

(52) U.S. Cl. ............. 726/24; 726/22; 726/23; 726/25; 713/187; 713/188; 709/224

(58) Field of Classification Search .......... 726/22–25; 713/187–188; 709/224

See application file for complete search history.

(56) References Cited

U.S. PATENT DOCUMENTS

| | | | |
|---|---|---|---|
| 5,842,002 A * | 11/1998 | Schnurer et al. | 703/21 |
| 5,881,151 A * | 3/1999 | Yamamoto | 726/24 |
| 5,948,104 A * | 9/1999 | Gluck et al. | 726/24 |
| 6,035,423 A * | 3/2000 | Hodges et al. | 714/38 |
| 6,240,530 B1 * | 5/2001 | Togawa | 714/38 |
| 6,842,861 B1 * | 1/2005 | Cox et al. | 713/188 |
| 7,062,553 B2 * | 6/2006 | Liang | 709/224 |
| 7,089,589 B2 * | 8/2006 | Chefalas et al. | 726/22 |
| 7,216,366 B1 * | 5/2007 | Raz et al. | 726/24 |
| 7,231,408 B2 * | 6/2007 | Belcaid et al. | 1/1 |
| 7,231,440 B1 * | 6/2007 | Kouznetsov et al. | 709/224 |
| 7,299,035 B2 * | 11/2007 | Morota et al. | 455/418 |
| 7,353,511 B1 * | 4/2008 | Ziese | 717/178 |
| 7,363,657 B2 * | 4/2008 | Caccavale | 726/24 |
| 7,386,297 B2 * | 6/2008 | An | 455/410 |
| 7,490,354 B2 * | 2/2009 | Garbow et al. | 726/24 |
| 2002/0042886 A1 * | 4/2002 | Lahti et al. | 713/201 |
| 2002/0147915 A1 * | 10/2002 | Chefalas et al. | 713/188 |
| 2003/0070087 A1 * | 4/2003 | Gryaznov | 713/201 |
| 2003/0074581 A1 * | 4/2003 | Hursey et al. | 713/201 |
| 2003/0105973 A1 * | 6/2003 | Liang et al. | 713/200 |
| 2003/0157930 A1 * | 8/2003 | Morota et al. | 455/418 |
| 2004/0025042 A1 * | 2/2004 | Kouznetsov et al. | 713/200 |
| 2004/0158741 A1 * | 8/2004 | Schneider | 713/201 |
| 2004/0210645 A1 * | 10/2004 | Kouznetsov et al. | 709/220 |
| 2005/0176415 A1 * | 8/2005 | Jang et al. | 455/418 |
| 2005/0204150 A1 * | 9/2005 | Peikari | 713/200 |
| 2005/0283837 A1 * | 12/2005 | Olivier et al. | 726/24 |
| 2006/0101384 A1 * | 5/2006 | Sim-Tang et al. | 717/104 |

* cited by examiner

*Primary Examiner* — Christian LaForgia
*Assistant Examiner* — Kari L Schmidt
(74) *Attorney, Agent, or Firm* — Sughrue Mion, PLLC

(57) ABSTRACT

A method for curing a virus of data used in a mobile terminal communicating with a server through a mobile communication network is provided. The method includes forming an antivirus program database on the server and continuously updating the database with antivirus programs; comparing state information of object data requiring virus checking by the updated antivirus programs among existing data stored in the mobile terminal with state information of the updated antivirus programs; and checking and curing the virus of the object data selectively.

22 Claims, 3 Drawing Sheets

METHOD FOR CURING A VIRUS ON A MOBILE COMMUNICATION NETWORK

CROSS-REFERENCE TO RELATED APPLICATIONS

This application claims benefit under 35 U.S.C. §119 from Korean Patent Application No. 2005-15483, filed on Feb. 24, 2005, the entire content of which is incorporated herein by reference.

BACKGROUND OF THE INVENTION

1. Field of the Invention

The present invention relates to a method for curing a virus on a mobile communication network, and more particularly, to a method for curing a virus of a mobile terminal in a mobile communication network environment.

2. Description of the Related Art

In general, in order to cure a virus of various data including software stored in a memory, a mobile terminal, such as a cellular phone or a personal digital assistant (PDA), downloads antivirus programs from a general information processing device or an information processing device positioned in a mobile communication center (hereinafter, referred to as 'server'), installs the antivirus programs and checks and cures the virus. Alternatively, the mobile terminal must download and use non-infected data, namely, virus-free data.

FIG. 1 is a structure view illustrating one example of a conventional method for curing a virus on a mobile communication network.

Referring to FIG. 1, a mobile terminal 10 communicates with a server 20 through the mobile communication network, and the server 20 communicates with an external server 30, which stores antivirus programs, through an internet 1 and updates the antivirus programs.

That is, the server 20 includes a virus database for storing the antivirus programs for checking and curing the virus, receives the latest antivirus programs from the external server 30, and updates the database.

The mobile terminal 10 downloads data including necessary software from the server 20. In the download process, the server 20 checks for viruses of the data using the antivirus programs stored in the virus database, and transmits the virus-free data to the mobile terminal 10.

Accordingly, the mobile terminal 10 can download and use the virus free data including the software. New viruses are constantly being generated. Consequently, new antivirus programs are also constantly being generated to counteract the new viruses. Since the antivirus programs of the server 20 are always updated with the latest antivirus programs, the data including the software newly downloaded to the mobile terminal 10 can be protected from the latest viruses.

However, the aforementioned method cannot check for a new virus infection or cure the virus of the data including the software previously downloaded and stored in a memory of the mobile terminal 10.

FIG. 2 is a structure view illustrating another example of a conventional method for curing a virus on a mobile communication network.

A mobile terminal 10' downloads data including necessary software through an internet 1. In addition, the mobile terminal 10' directly communicates through the internet 1 with an external server 30' storing antivirus programs, downloads and installs the antivirus programs, and the mobile terminal itself checks and cures the virus of the data including the software.

Therefore, the mobile terminal 10' maintains a virus database, downloads the latest antivirus programs, updates the virus database, and checks for a virus in all the data including the software stored in a memory by using the updated virus database. The existing data including the software can be protected from both an existing virus and a latest virus.

However, the above-described method requires a large capacity of storage space on the mobile terminal 10' in order to maintain the virus database, and also requires a large processing capacity to check the virus by the whole virus database. As a result, this method is only applicable to a mobile terminal having a high performance processing function and a large capacity memory.

SUMMARY OF THE INVENTION

Accordingly, it is an aspect of the present invention to provide a method for curing a virus on a mobile communication network which can check and cure the virus through a server by using a memory and a processing capacity of a mobile terminal as little as possible.

According to an exemplary embodiment of the present invention, there is provided a method for curing a virus of data used in a mobile terminal communicating with a server through a mobile communication network, of the method including forming an antivirus program database on the server and continuously updating the database with antivirus programs; comparing state information of the object data requiring virus checking by the updated antivirus programs among the existing data stored in the mobile terminal with state information of the updated antivirus programs; and checking and curing the virus selectively.

Preferably, but not necessarily, when the server checks and cures the virus, the mobile terminal transmits the object data to the server, and the server checks and cures the virus of the object data.

More preferably, but not necessarily, the server provides time stamps to the antivirus programs which are updated in the database in an update order.

Preferably, but not necessarily, the server marks a latest time stamp among the time stamps provided to the antivirus programs which have checked and cured the virus of the object data, and notifies the mobile terminal of the marked time stamp.

Preferably, but not necessarily, the object data are the existing data in the mobile terminal marked with a time stamp earlier than the latest time stamp.

Preferably, but not necessarily, the method for curing the virus on the mobile communication network further includes transmitting, at the server, the latest time stamp provided to the antivirus programs stored in the database to the mobile terminal; receiving, as the object data, the existing data marked with the time stamp before the latest time stamp from the mobile terminal; and checking and curing the virus of the object data.

Preferably, but not necessarily, the method for curing the virus on the mobile communication network further includes receiving, at the server, both an earliest final time stamp among the time stamps marked on the existing data and the state information of the object data, from the mobile terminal; and comparing the state information of the antivirus programs provided with the time stamps later than the final time stamp with the state information of the object data.

More preferably, but not necessarily, the state information of the object data and of the antivirus programs is the size of the object data and the size of the antivirus programs, respectively.

Preferably, but not necessarily, the method for curing the virus on the mobile communication network further includes checking and curing, at the server, a virus of new data by using the virus database, when the mobile terminal intends to download the new data.

Preferably, but not necessarily, when the mobile terminal checks and cures the virus, the mobile terminal receives the updated antivirus programs from the server, and checks and cures the virus of the stored data.

More preferably, but not necessarily, the time stamps are provided to the antivirus programs updated in the database in an update order.

Preferably, but not necessarily, the existing data stored in the mobile terminal are marked with the time stamp provided to the antivirus programs which have checked and cured the virus of the existing data among the antivirus programs.

Preferably, but not necessarily, the object data are the existing data marked with a time stamp earlier than a latest time stamp among the time stamps provided to the antivirus programs among the existing data stored in the mobile terminal.

Preferably, but not necessarily, the method for curing the virus on the mobile communication network further includes receiving, at the mobile terminal, a latest time stamp provided to the antivirus programs stored in the database from the server; selecting the object data marked with time stamps earlier than the latest time stamp from the server; confirming an earliest final time stamp among the time stamps marked on the object data; receiving the antivirus programs provided with the time stamps later than the final time stamp from the server; and checking and curing the virus.

More preferably, but not necessarily, the state information of the object data and of the antivirus programs is the size of the object data and the size of the antivirus programs, respectively.

Preferably, but not necessarily, the method for curing the virus on the mobile communication network further includes requesting, at the mobile terminal, the server to check and cure a virus of new data by using the virus database, when the mobile terminal intends to download the new data.

According to another exemplary embodiment of the present invention, a method for curing a virus on a mobile communications network is provided, the method including receiving a request to download data from a mobile terminal; checking a virus of the requested data by using antivirus programs stored in a virus database; time stamping the checked data with a time stamp corresponding to a antivirus program which is stored in the virus database and which has been used to check the virus; and transmitting the time stamped data to the mobile network.

According to another exemplary embodiment of the present invention, a method for curing a virus on a mobile communications network is provided, the method including transmitting a request for state information about a virus database; receiving the state information; selecting object data based upon the received state information; transmitting information about the object data; receiving updated virus programs based on the transmitted information; checking a virus of the object data locally using the received updated virus programs; and updating a final time stamp of the object data.

The transmitted information may be the final time stamp of the object data.

The transmitted information may also be the size of the object data.

According to another exemplary embodiment of the present invention, a method for curing a virus on a mobile communications network is provided, the method including receiving parameter information about object data which requires virus checking from a mobile terminal; comparing the received parameter information with parameter information about antivirus programs stored on a server; based upon the comparison, deciding to check a virus of the object data on a server or on a mobile terminal.

The parameter information about the object data and the parameter information about the antivirus programs may be a size of the object data and a size of the antivirus programs, respectively.

If the decision is made to check the virus on the server, the method may further include requesting the mobile terminal to transmit the object data to the server; receiving the object data from the mobile terminal; and checking the virus of the object data on the server.

If the decision is made to check the virus on the mobile terminal, the method may further include transmitting the antivirus programs to the mobile terminal.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

A method for curing a virus on a mobile communication network in accordance with an exemplary embodiment of the present invention will now be described in detail with reference to the accompanying drawings.

Figure 1:
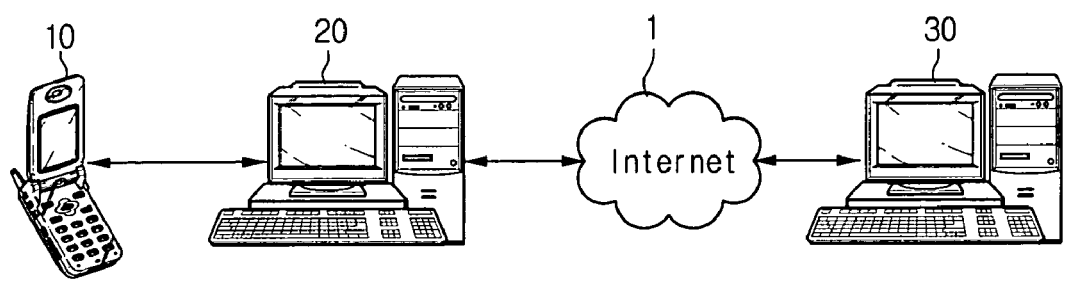
FIG. 1 is a structure view illustrating one example of a conventional method for curing a virus on a mobile communication network.
Figure 2:
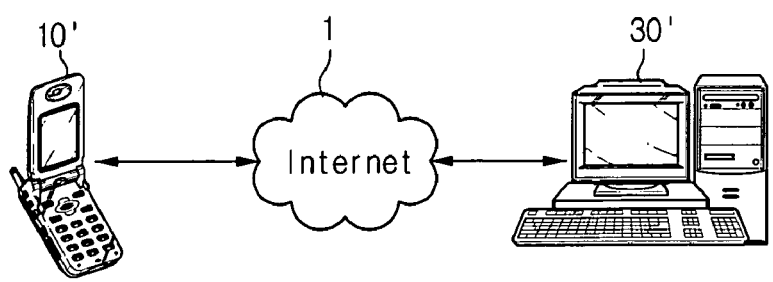
FIG. 2 is a structure view illustrating another example of a conventional method for curing a virus on a mobile communication network.
Figure 3:
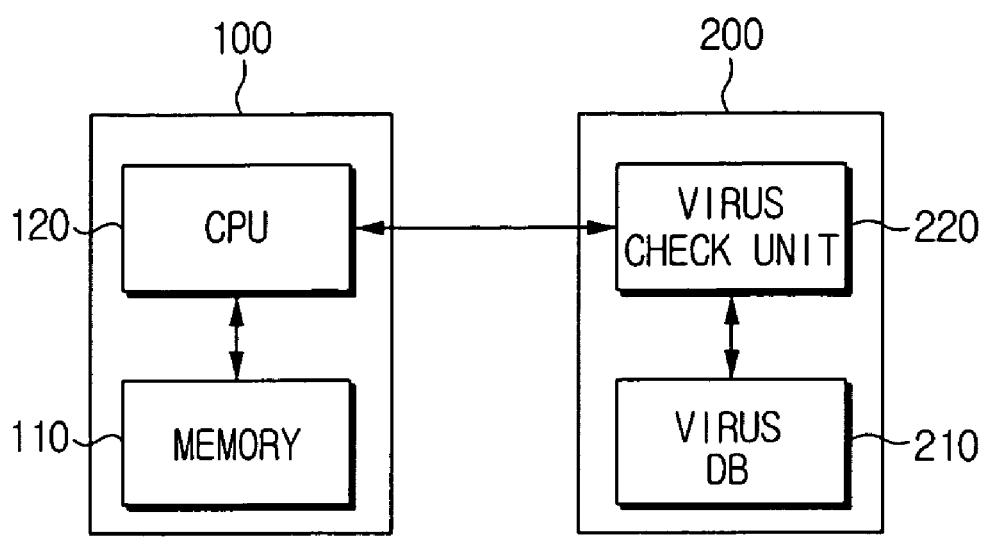
FIG. 3 is a structure view illustrating a method for curing a virus on a mobile communication network in accordance with an exemplary embodiment of the present invention.

FIG. 3 is a structure view illustrating the method for curing the virus on the mobile communication network in accordance with an exemplary embodiment of the present invention.

As shown in FIG. 3, a mobile terminal 100 such as a cellular phone, a palm top computer, a smart phone, or other such communications device known in the art, is connected to a server 200 installed in a mobile communication center through a mobile communication network for communication. FIG. 3 shows the elements of the mobile terminal 100 and the server relating to explanations of the method for curing the virus on the mobile communication network in accordance with an exemplary embodiment of the present invention, and omits the other elements for performing communication and other functions.

The mobile terminal 100 includes a memory 110 and a CPU 120. The memory 110 stores both software for performing various functions of the mobile terminal 100 and data which includes general contents. In the case where the mobile terminal 100 receives antivirus programs from the server 200, the memory 110 stores the antivirus programs.

The CPU 120 controls various functions of the mobile terminal 100. Especially, the CPU 120 controls a communication module (not shown) to perform the method for curing a virus, thereby communicating with the server 200 through the mobile communication network.

The server 200 includes a virus database (virus db) 210 and a virus check unit 220.

The virus database 210 stores the antivirus programs, receives the latest antivirus programs from an external server (not shown), stores the antivirus programs, and updates the database. In addition, the virus database 210 time stamps the updated antivirus programs in an update order.

The virus check unit 220 updates the virus database 210, communicates with the mobile terminal 100, and transmits the software of the mobile terminal 100 and antivirus programs necessary for the data having general contents to the mobile terminal 100, and may also check and cure the virus of the software and of the data including general contents transmitted from the mobile terminal 100.

Figure 4:
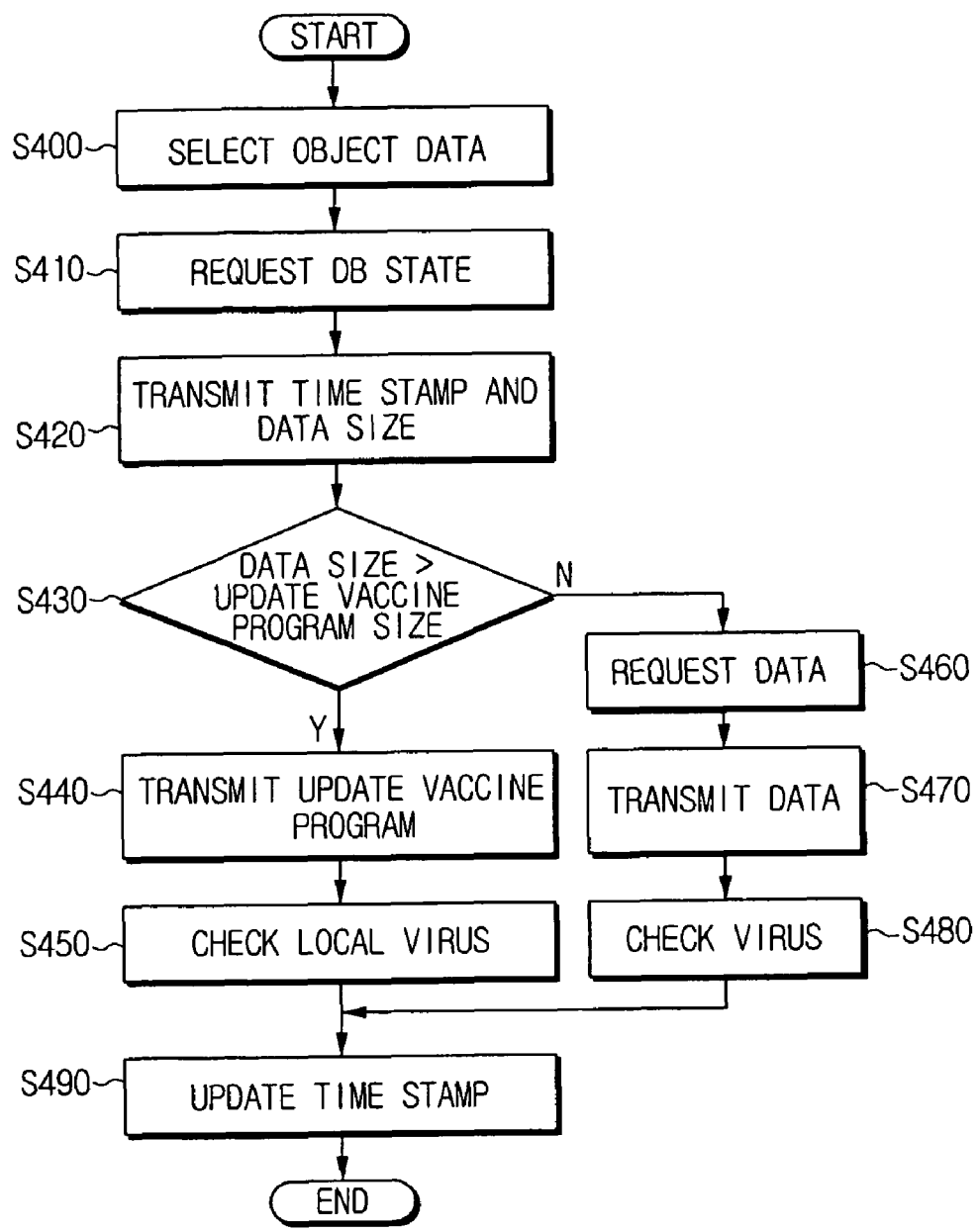
FIG. 4 is a flowchart showing a method for curing a virus on a mobile communication network in accordance with an exemplary embodiment of the present invention.

FIG. 4 is a flowchart showing a method for curing a virus on a mobile communication network in accordance with an exemplary embodiment of the present invention.

In the method for curing a virus on a mobile communication network, when the mobile terminal 100 intends to download data, including new software and general content data, the server 200 checks a virus of the requested data by using the virus database 210, time stamps the data with a time stamp corresponding to the latest antivirus programs stored in the virus database 210, and transmits the data to the mobile terminal 100.

Since every data used in the mobile terminal 100 is marked with the time stamps, respectively, the user can be informed of which of the updated antivirus programs, among the antivirus programs stored in the virus database 210, has checked the virus.

Hereinafter, the initial state of the virus database 210 of the server 200 is represented by $DB_0$, the antivirus programs in the update order are represented by $U_1, U_2, U_3, \ldots, U_n$, and the size of the updated antivirus programs is represented by $u_1, u_2, u_3, \ldots, u_n$. Here, the time stamps for the antivirus programs $U_1, U_2, U_3, \ldots, U_n$ are represented by $1, 2, 3, \ldots, n$, but can be variously represented, for example, by an update time.

In addition, in the software and the data having general contents used in the mobile terminal 100 (hereinafter, referred to as 'data'), an $i^{-th}$ data is represented by $S_i^k$, and the size of the data is represented by $S_i^k$. Here, k means that the data $S_i^k$ has been checked by the antivirus programs corresponding to the time stamp k.

Therefore, the current state of the virus database 210 of the server 200 can be represented by $DB=DB_0 \cup U_1 \cup U_2 \cup \ldots \cup U_n$, and the data used in the mobile terminal 100 can be represented by $S_1^{n-1}, S_2^n, S_3^{n-3}, \ldots, S_m^{n-5}$ by way of an example.

On the other hand, when a new virus is discovered, the server 200 receives the antivirus programs for checking and curing the virus from an external server (not shown), updates the virus database 210, and notifies the mobile terminal 100 that there is a new virus for virus curing.

The mobile terminal 100 may periodically communicate with the server 200 to check a virus of the used data, examine the state of the virus database 210, and cure the virus.

First, the mobile terminal 100 selects the object data for which to check and cure the virus (S400). For example, the selected data are represented by $(S_1, 6, s_1), (S_2, 4, s_2), (S_3, 7, s_3), (S_4, 4, s_4), (S_5, 5, s_5), (S_6, 7, s_6)$. Here, $S_i$ denotes the data, the number denotes the time stamp marked on the corresponding data, and $s_i$ denotes the size of the corresponding data.

The mobile terminal 100 requests the current state information p of the virus database 210 from the server 200 to cure the virus of the selected data (S410). As described above, the current state of the virus database 210 can be represented by $DB=DB_0 \cup U_1 \cup U_2 \cup \ldots \cup U_n$, and the state information of the virus database 210 can be represented by p=n by using the time stamp n corresponding to the finally-updated antivirus programs $U_n$. For example, when the state of the server 200 is $DB=DB_0 \cup U_1 \cup U_2 \cup \ldots \cup U_7$, the state information of the virus database 210 is represented by p=7.

Accordingly, the server 200 responds to the state information request of the mobile terminal 100 as p=n, namely, p=7 in the above example. The mobile terminal 100 selects the time stamp I marked on the data checked by the firstly-updated antivirus programs, namely, the minimum value $I=\min\{4, 5, 6, 7\}=4$ of the time stamps marked on each data in the above example.

The mobile terminal 100 selects the object data requiring virus checking. In the above example, the time stamp marked on the data $S_3$ and $S_6$ is 7, which corresponds to the state information 7 of the virus database 210 of the server 200. This means that the data $S_3$ and $S_6$ have been virus-checked by the latest antivirus program $U_7$ of the virus database 210. As a result, the data requiring virus checking are $S_2, S_1, S_4, S_5$. In addition, the mobile terminal 100 calculates the total size of the data, $SS=s_2+s_1+s_4+s_6$.

Thereafter, the mobile terminal 100 transmits the final time stamp I and the size SS of the object data to the server 200 (S420).

The server 200 receives the final update time stamp I and the size SS of the check-requested data, and compares the size SS of the check-requested data with the size US' of the update antivirus programs (S430).

In the above example, the final update time stamp I is 4, and thus the update antivirus programs U having the time stamps larger than 4 are $U_5, U_6, U_7$. Therefore, the size of the update antivirus programs is $US'=u_5+u_6+u_7$. The server 200 compares the size $SS=s_2+s_1+s_4+s_6$ of the data requiring virus checking with the size $US'=u_5+u_6+u_7$ of the update antivirus programs.

When the size SS of the data is larger than the size US' of the vaccine program size, i.e. the size of the antivirus programs, the server 200 transmits the updated antivirus programs, namely, $U_5, U_6, U_7$ in the above example to the mobile terminal 100 (S440). The mobile terminal 100 itself checks the virus of the data requiring virus checking locally (S450).

However, when the size SS of the data is not larger than the size US' of the antivirus programs, the server 200 requests the mobile terminal 100 to transmit the corresponding data (S460) to the server 200. Here, transmitting the corresponding data to the server 200 and checking the virus of the data by the server 200 is more advantageous in terms of the memory and processing load of the mobile terminal 100 and the load of the communication network.

Accordingly, the mobile terminal 100 transmits the data requiring the latest update virus checking after the final time stamp, namely, $S_2, S_1, S_4, S_5$ in the above example, to the server 200. The server 200 checks the virus of the data by using the updated virus database 210 (S480).

After the virus checking is finished by the mobile terminal 100 or the server 200, the mobile terminal 100 updates the final update time stamp I to the time stamp corresponding to the latest antivirus programs, namely, 7 in the above example, and updates the time stamps of each data to 7 (S490).

By the above procedure, the mobile terminal communicates with the server through the mobile communication network, and checks and cures the virus. Even if the memory capacity or processing capacity of the mobile terminal is small, the virus can be checked and cured.

In addition, the mobile terminal needs only a small capacity of memory to check the virus. It is also possible to check and cure the new virus in the existing data stored in the memory of the mobile terminal.

The method for curing the virus on the mobile communication network in accordance with the present invention can also be programmed and executed by a computer.

As discussed earlier, in accordance with an exemplary embodiment of the present invention, the mobile terminal communicates with the server through the mobile communication network, and checks and cures the virus of the software and the data having general contents by the latest antivirus programs. Therefore, even if the memory capacity or processing capacity of the mobile terminal is small, the latest virus can be still be cured by the server.

Furthermore, the latest virus can be checked and cured in the existing data stored in the memory of the mobile terminal while using the memory capacity and processing capacity as little as possible.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for curing a virus of data used in a mobile terminal communicating with a server through a mobile communication network, the method comprising:
    forming an antivirus program database on the server and continuously updating the database with antivirus programs;
    comparing, in the mobile terminal, a size of object data requiring virus checking by the updated antivirus programs among existing data stored in the mobile terminal with an actual size of the updated antivirus programs for determining a place to check and cure the virus; and
    checking and curing the virus, by the mobile terminal, if the size of the object data is greater than the actual size of the updated antivirus programs, and checking and curing the virus, by the server, if the actual size of the updated antivirus programs is greater than the size of the object data,
    wherein the object data includes all data having lower state information compared to state information of the database based on the database of the state information, and the updated database includes all antivirus programs that are lately updated compared to antivirus programs applied to earliest updated data among the data.

2. The method as claimed in claim 1, wherein the server provides time stamps to the antivirus programs which are updated in the database in an update order.

3. The method as claimed in claim 2, wherein the server marks a latest time stamp among the time stamps provided to the antivirus programs which have checked and cured the virus of the object data, and notifies the mobile terminal of the marked time stamp.

4. The method as claimed in claim 3, wherein the object data are the existing data in the mobile terminal marked with a time stamp earlier than the latest time stamp.

5. The method as claimed in claim 3, further comprising transmitting, at the server, the latest time stamp provided to the antivirus programs stored in the database, to the mobile terminal;
    receiving, as the object data, the existing data marked with time stamps earlier than the latest time stamp from the mobile terminal; and
    checking and curing the virus of the object data.

6. The method as claimed in claim 5, further comprising:
    receiving, at the server, both an earliest final time stamp among the time stamps marked on the existing data and the state information of the object data, from the mobile terminal; and
    comparing the state information of the antivirus programs provided with the time stamps later than the final time stamp with the state information of the object data.

7. The method as claimed in claim 6, wherein the state information of the object data and of the antivirus programs is the size of the object data and the size of the antivirus programs, respectively.

8. The method as claimed in claim 1, further comprising checking and curing, at the server, a virus of new data by using the virus database, when the mobile terminal intends to download the new data.

9. The method as claimed in claim 1, wherein, when the mobile terminal checks and cures the virus, the mobile terminal receives the updated antivirus programs from the server, and checks and cures the virus of the existing data stored in the mobile terminal.

10. The method as claimed in claim 9, wherein time stamps are provided to the antivirus programs updated in the database in an update order.

11. The method as claimed in claim 10, wherein the existing data stored in the mobile terminal are marked with the time stamp provided to the antivirus programs which have checked and cured the virus of the existing data among the antivirus programs.

12. The method as claimed in claim 10, wherein the object data are the existing data marked with a time stamp earlier than a latest time stamp among the time stamps provided to the antivirus programs among the existing data stored in the mobile terminal.

13. The method as claimed in claim 10, further comprising:
    receiving, at the mobile terminal, a latest time stamp provided to the antivirus programs stored in the database, from the server;
    selecting the object data marked with time stamps earlier than the latest time stamp from the server,
    confirming an earliest final time stamp among the time stamps marked on the object data;
    receiving the antivirus programs provided with the time stamps later than the final time stamp from the server; and
    checking and curing the virus.

14. The method as claimed in claim 10, wherein the state information of the object data and of the antivirus programs is the size of the object data and the size of the antivirus programs, respectively.

15. The method as claimed in claim 10, further comprising requesting, at the mobile terminal, the server to check and cure a virus of new data by using the virus database, when the mobile terminal intends to download the new data.

16. A method for curing a virus on a mobile communications network, the method comprising:
    receiving a request to download data from a mobile terminal;

checking a virus of the requested data by using antivirus programs stored in a virus database;

time stamping the checked data with a time stamp corresponding to a antivirus program which is stored in the virus database and which has been used to check the virus; and transmitting the time stamped data to the mobile terminal, wherein the mobile terminal selects data marked with time stamps earlier than the time stamp regarding updating of antivirus programs stored in the virus database to be data requiring virus checking, further comprising;

transmitting the updated antivirus programs to the mobile terminal if the size of object data is greater than the actual size of the updated antivirus programs, and checking and curing the virus, by server, if the actual size of the updated antivirus programs is greater than the size of the object data according to a comparison result by the mobile terminal, wherein the comparison by the mobile terminal is the comparing a size of the object data requiring virus checking by the updated antivirus programs among existing data stored in the mobile terminal with an actual size of the updated antivirus programs for determining a place to check and cure the virus, wherein the object data includes all data having lower state information compared to state information of the database based on the database of the state information, and the updated database includes all antivirus programs that are lately updated compared to antivirus programs applied to earliest updated data among the data.

17. A method for curing a virus on a mobile communications network, the method comprising:

transmitting a request for state information about a virus database from a mobile terminal to a server;

receiving the state information;

selecting object data based upon the received state information;

transmitting information about the object data;

receiving updated virus programs based on the transmitted information;

checking a virus of the object data locally using the received updated virus programs; and updating a final time stamp of the object data, wherein the received state information comprises time stamps provided to antivirus programs which are updated in an update order, wherein the selecting comprises selecting data marked with time stamps earlier than the time stamps regarding updating of the virus program received to be the object data, further comprising;

comparing, in the mobile terminal, a size of the object data requiring virus checking by the updated antivirus programs among existing data stored in the mobile terminal with an actual size of the updated antivirus programs for determining a place to check and cure the virus; and checking and curing the virus, in the mobile terminal, if the size of the object data is greater than the actual size of the updated antivirus programs, and transmitting the object data to server, if the actual size of the updated antivirus programs is greater than the size of the object data, wherein the object data includes all data having lower state information compared to state information of the database based on the database of the state information, and the updated database includes all antivirus programs that are lately updated compared to antivirus programs applied to earliest updated data among the data.

18. The method as claimed in claim 17, wherein the transmitted information is the final time stamp of the object data.

19. The method as claimed in claim 17, wherein the transmitted information is the size of the object data.

20. A method for curing a virus on a mobile communications network, the method comprising:

receiving a size of object data which requires virus checking from a mobile terminal;

comparing the received size of object data with an actual size of antivirus programs stored on a server;

checking a virus of the object data on a mobile terminal, if the size of object data is greater than the actual size of the updated antivirus programs, and checking a virus of the object data on a server, if the actual size of the updated antivirus programs is greater than the size of object data, where, the object data includes all data having lower state information compared to state information of the database based on the database of the state information, and the updated database includes all antivirus programs that are lately updated compared to antivirus programs applied to earliest updated data among the data.

21. The method according to claim 20, wherein if the decision is made to check the virus on the server, the method further comprises:

requesting the mobile terminal to transmit the object data to the server;

receiving the object data from the mobile terminal; and checking the virus of the object data on the server.

22. The method according to claim 20, wherein if the decision is made to check the virus on the mobile terminal, transmitting the antivirus programs to the mobile terminal.

* * * * *